Oct. 2, 1951     P. T. SEMM ET AL     2,569,697
REVERSIBLE MOTOR CONTROL APPARATUS
Filed June 1, 1948
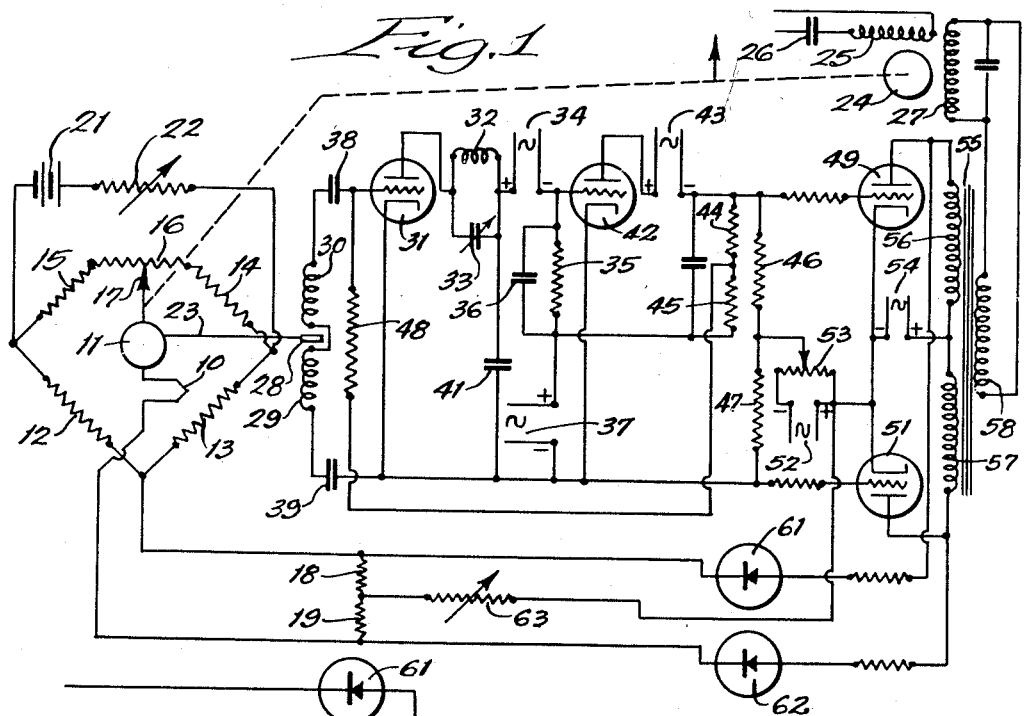
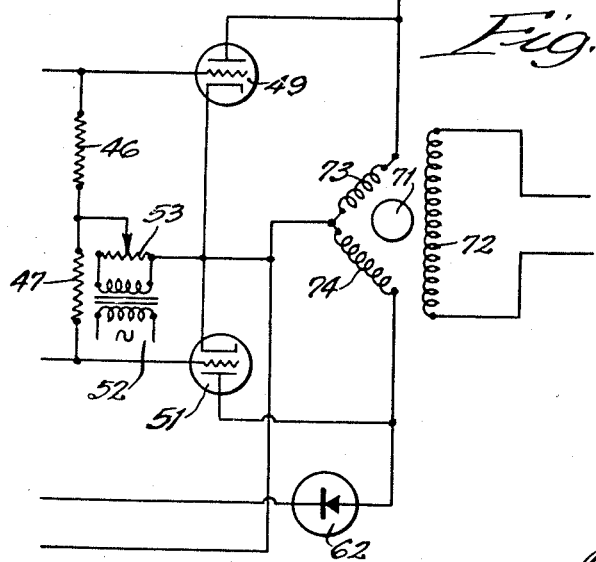
Inventors:
Paul T. Semm
and Robert T. Nakasone.
By Dawson, Ooms, Booth and Spangenberg,
Attorneys Patented Oct. 2, 1951

2,569,697

UNITED STATES PATENT OFFICE 2,569,697

REVERSIBLE MOTOR CONTROL APPARATUS

Paul T. Semm, Batavia, and Robert T. Nakasone, Chicago, Ill., assignors to Wheelco Instruments Company, Chicago, Ill., a corporation of Illinois Application June 1, 1948, Serial No. 30,337

10 Claims. (Cl. 318—28)

This invention relates to measuring apparatus and more particularly to apparatus for recording and/or controlling a physical condition such as temperature, pressure or the like.

One of the objects of the invention is to provide a measuring apparatus which operates electrically to produce movements of a reversible motor in accordance with changes in a condition to be measured.

Another object is to provide measuring apparatus in which a reversible motor is controlled by movement of a pointer in response to unbalance of a balancing network which is rebalanced by the motor. In the preferred construction the movement of the pointer controls the tuned condition of an oscillator which in turn controls the operating or control circuits for the motor.

Still another object is to provide a measuring apparatus in which a rebalancing voltage is produced in accordance with the condition of the operating or control circuits of the motor and which may be impressed on the sensing network of the apparatus to prevent over-shooting or hunting of the motor. According to one feature of the invention the rebalancing voltage is derived directly from the motor operating or control circuits and is developed across a pair of series connected resistors which are connected respectively to the motor operating or control circuits.

The above and other objects and advantages of the invention will be more readily apparent when read in connection with the accompanying drawing, in which—

Figure 1 is a circuit diagram of one form of measuring apparatus embodying the invention; and Figure 2 is a partial circuit diagram of an alternative motor control.

As shown in Figure 1, the apparatus is adapted to measure a physical condition such as temperature, pressure or the like, and for this purpose employs a sensitive element which will develop a voltage in response to changes in the condition. As illustrative of such an element, a thermo-couple 10 is shown which is connected through a galvanometer or similar voltage responsive instrument 11 across a resistance bridge circuit. The resistance bridge circuit includes four fixed resistors 12, 13, 14 and 15 and a variable potentiometer resistance 16 which is engaged by a wiper 17 connected in the galvanometer and thermo-couple circuit. The galvanometer and thermo-couple circuit also includes a pair of equal resistors 18 and 19 in series, the purpose of which will be explained hereinafter. The bridge may be supplied with a direct voltage from any desired source shown as a battery 21 connected through a variable adjusting resistor 22 across the corners of the bridge. The galvanometer 11 has a pointer 23 which will be moved in one direction or the other upon an unbalance of the circuit due, for example, to a change in the thermo-couple voltage.

The circuit is adapted to be rebalanced by a reversible motor shown in Figure 1 as a two-phase motor having a rotor 24 connected to the wiper 17 to adjust it. The motor includes a reference winding 25 connected to any desired source of alternating current through a condenser 26 and a control winding 27. By changing the phase of the voltage supplied to the control winding 27 with respect to the phase of the reference voltage in the winding 25, the direction of the motor will be reversed as is understood in the art.

To control the motor, control circuits are provided responsive to the position of the pointer 23 so that the motor will be operated in one direction or the other depending upon the direction of deflection of the pointer to move the wiper 17 thereby to rebalance the circuit. As shown, the pointer carries a metal flag 28 movable between a pair of coils 29 and 30 which form a part of the tuned input circuit of an oscillator. The oscillator includes a tube 31 whose plate is connected to a tuned tank circuit including an inductance coil 32 and a condenser 33. Power is supplied to the oscillator from a source 34 and the output from the oscillator is supplied to a load resistor 35 having a condenser 36 in parallel therewith. Additional plate supply for the oscillator may be furnished by the source 37 in series with the source 34. The sources 34 and 37 as well as the other sources to be referred to hereinafter may be derived from transformers supplied from the same source as the winding 25 and whose instantaneous polarities are as indicated in the drawing.

The input circuit of the oscillator includes the coils 29 and 30 with the upper end of the coil 30 connected to the grid of the tube 31 through a condenser 38. A matching condenser 39 connects the lower end of the coil 29 to the cathode of the tube, as shown. An intermediate frequency bypass condenser 41 is preferably connected across the plate circuit of the tube, as shown.

The output of the oscillator across the load resistor 35 is applied to the input circuit of an amplifier tube 42 having a plate supply 43. The plate circuit of the tube is connected across voltage divider resistors 44 and 45 and voltage divider load resistors 46 and 47. The resistors 44 and 45 are connected to the lower end of the load resistor 35 as shown, and the mid point between them is connected through a resistor 48 to the grid of the tube 31 to supply a feedback voltage to the oscillator. Obtaining the feedback from the output of the amplifier tube produces a greater change in plate current for a given movement of the flag 28 than would otherwise be obtainable.

The flow of current through the load resistors 46 and 47 controls a pair of motor controlled tubes 49 and 51 which may be either vacuum tubes or gaseous discharge tubes, as preferred. As shown, the grid of the tube 49 is connected to the upper end of resistor 46 and the grid of tube 51 is connected to the lower end of resistor 47. A variable bias is supplied to the tubes from a source 52 through a variable bias resistor 53 which is connected to the mid point between the resistors 46 and 47. The plate supply for the tubes 49 and 51 is from a source 54 which is connected at one side to the cathodes of the tubes and at its other side to a center tap on the primary winding of a transformer 55. The center tap divides the transformer primary into an upper section 56 which is connected to the plate of tube 49 and a lower section 57 which is connected to the plate of tube 51. A secondary winding 58 on the transformer is connected to the motor control winding 27.

In operation of the apparatus as so far described, the flag 28 is normally half way into the coils 29 and 30 so that the oscillator has a predetermined normal tuning at partial resonance. Under these conditions a predetermined current will flow through the load resistor 35 to produce a predetermined bias on the grid of the tube 42 so that a voltage will be impressed across resistors 46 and 47 from the source 43 which is equal and opposite to the voltage produced across resistors 46 and 47 by the source 37. There will, therefore, be no current flow through resistors 46 and 47. By properly adjusting the potentiometer 53 a negative bias can be produced on the grids of the tubes 49 and 51 which is sufficient to bias the tubes to cut off. Thus no currents flow through either of sections 56 and 57 of the transformer primary so that zero current is produced in the motor control winding 27 and the motor is stationary.

As the flag moves in one direction or the other, as, for example, farther into the coils 29 and 30, it tends to deresonate the oscillator to change the bias on the tube 42. This will cause a current flow through the resistors 46 and 47 in a direction to increase the negative bias on one of the tubes 49 and 51 and decrease the bias on the other. One of the tubes, therefore, remains non-conductive while the conductivity of the other increases so that a current of a given polarity will be supplied to the motor control winding 27 to turn the motor in a direction which will move the contact 17 to rebalance the bridge circuit. Upon attaining rebalance, the pointer 23 will move the flag 28 back to its normal position and the motor will stop. It will be apparent that the extent of movement of the motor is proportional to the extent of unbalance of the network as produced, for example, by a change in thermo-couple voltage so that the position of the motor becomes an accurate indication of the temperature or other condition to be measured. The motor can, therefore, be utilized to operate a recording or control mechanism for the condition being measured.

To prevent overshooting or hunting of the motor, a rebalancing voltage is derived from the motor control circuit and is impressed on the balancing network. As shown, this voltage is derived by connecting the outer end of the primary section 56 through a rectifier 61 to the upper end of the resistor 18 and by similarly connecting the outer end of the primary section 57 through a rectifier 62 to the lower end of the resistor 19. The mid point between the resistors 18 and 19 may be connected through an adjustable resistor 63 to the cathode circuit of the tubes 49 and 51, as shown.

With this construction when both tubes are conducting in the normal condition of the apparatus, the voltages impressed on the rectifiers 61 and 62 will be equal so that current flow through the resistors 18 and 19 will be very small and equal. At this time the outer terminals of the resistors 18 and 19 are at the same potential so that the resistors do not affect balance of the network. However, when one of the tubes is biased to cut-off, as, for example, the tube 49, the voltage impressed on its rectifier 61 will increase to increase the current flow through its resistor 18 so that the outer end of resistor 18 will become positive with respect to the outer end of resistor 19. Thus a direct voltage of a polarity determined by the condition of the motor control circuit is impressed on the network to oppose unbalance of the network and to tend to stop the motor before the galvanometer pointer has completely returned to its neutral position. By adjusting the resistor 63 the value of the rebalancing voltage can be varied to compensate for any lag in the apparatus or the system controlled thereby so that the motor will be prevented from overshooting and hunting.

Figure 2 partially illustrates an alternative arrangement in which a shaded pole motor is employed, parts of the circuit shown corresponding to identical parts in Figure 1 being indicated by the same reference numerals. In this construction the same control circuit functions to control a reversible shaded pole motor having a rotor 71 which may be connected to the wiper 17. A main winding 72 for the motor is connected to the alternating current source, and the motor includes shaded windings 73 and 74. The winding 73 is connected to the plate of tube 49, the winding 74 is connected to the plate of tube 51, and the mid point between the windings is connected in common to the cathodes of both tubes.

In operation of this circuit, tubes 49 and 51 are normally both conducting when the apparatus is in its neutral or normal position so that the current flows through both shaded windings are equal and the motor is stationary. When either of the tubes becomes non-conductive through operation of the control circuits, current ceases to flow through the winding to which it is connected so that the motor will turn in one direction. When either of the tubes becomes non-conducting, the voltage impressed on its rectifier 61 or 62 will increase as in Figure 1 to produce a rebalancing voltage which can be impressed on the network. Other than for the differences in motor construction, the circuit of Figure 2 is substantially identical of Figure 1 and functions in the same manner.

While two embodiments of the invention have been shown and described in detail herein, it will be understood that these are illustrative only and are not to be taken as a definition of the scope of the invention, reference being had for this purpose to the appended claims.

What is claimed is:

1. A measuring apparatus comprising a balancing electrical network, means responsive to a condition to be measured connected to the network to unbalance it upon a change in the condition, a device movable to rebalance the network, a reversible electric motor connected to the device to move it, a sensitive instrument connected to the network and responsive to unbalance thereof, a pointer connected to the instrument to be moved thereby, a pair of control circuits for the motor each including a winding and the windings having a common connection at one end, means responsive to movement of the pointer to control the windings, a pair of resistors in series having their outer ends connected to the other ends of the windings and their mid point connected to the common connection, and connections from the outer ends of the resistors to the network to impress a rebalancing voltage on the network when the control circuits are in dissimilar condition.

2. A measuring apparatus comprising a balancing electrical network, means responsive to a condition to be measured connected to the network to unbalance it upon a change in the condition, a device movable to rebalance the network, a reversible electric motor connected to the device to move it, a sensitive instrument connected to the network and responsive to unbalance thereof, a pointer connected to the instrument to be moved thereby, a transformer having a center tapped primary and a secondary connected to the motor to control it, separate circuits connected to the ends of the primary respectively and to the center tap, means responsive to the movement of the pointer to control the circuits, a pair of series connected resistors having their outer ends connected to the ends of the primary respectively and their mid point connected to the center tap, and connections from the ends of the resistors to the network to impress a rebalancing voltage thereon.

3. A measuring apparatus comprising a balancing electrical network, means responsive to a condition to be measured connected to the network to unbalance it upon a change in the condition, a device movable to rebalance the network, a reversible electric motor connected to the device to move it, a sensitive instrument connected to the network and responsive to unbalance thereof, a pointer connected to the instrument to be moved thereby, a transformer having a center tapped primary and a secondary connected to the motor to control it, separate circuit connected to the ends of the primary respectively and to the center tap, means responsive to the movement of the pointer to control the circuits, a pair of series connected resistors having their outer ends connected to the ends of the primary respectively and their mid point connected to the center tap, rectifiers in the first connections to permit flow only from the ends of the primary to the ends of the resistors, and connections from the ends of the resistors to the network to impress a rebalancing voltage thereon.

4. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an oscillator including a tuned circuit, a variable reactance device in the tuned circuit to vary the tuning of the oscillator including relatively movable parts one of which is connected to the pointer, a pair of interconnected circuits the relative conductivity of which controls the motor, tubes in the circuits to control them, and means responsive to the tuned condition of the oscillator to control the tubes.

5. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an oscillator including a tuned circuit, a variable reactance device in the tuned circuit to vary the tuning of the oscillator including relatively movable parts one of which is connected to the pointer, a pair of interconnected circuits, the relative conductivity of which controls the motor, tubes in the circuits to control them, means responsive to the tuned condition of the oscillator to control the relative conductivity of the tubes, and means responsive to the condition of the circuits to impress a rebalancing voltage on the network.

6. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an oscillator including a tuned circuit, a variable reactance device in the tuned circuit to vary the tuning of the oscillator including relatively movable parts one of which is connected to the pointer, a pair of interconnected circuits the relative conductivity of which controls the motor, tubes in the circuits to control them, and means responsive to the tuned condition of the oscillator to control the tubes, and means responsive to the condition of the tubes to impress a rebalancing voltage on the network.

7. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an oscillator including a tuned circuit, a variable reactance device in the tuned circuit to vary the tuning of the oscillator including relatively movable parts one of which is connected to the pointer, a transformer having a center tapped primary, circuits connected to the center tap and the ends respectively of the primary, a secondary on the transformer connected to the motor to control it, and means responsive to the tuned condition of the oscillator to control the circuits thereby to control the motor.

8. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an oscillator including a tuned circuit, a variable reactance device in the tuned circuit to vary the tuning of the oscillator including relatively movable parts one of which is connected to the pointer, a transformer having a center tapped primary, circuits connected to the center tap and the ends respectively of the primary, a secondary on the transformer connected to the motor to control it, means responsive to the tuned condition of the oscillator to control the circuits thereby to control the motor, circuits including rectifiers connected across the said circuits, and connections from the last named circuits to the network to impress a rebalancing voltage thereon.

9. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an oscillator including a tuned circuit, a variable reactance device in the tuned circuit to vary the tuning of the oscillator including relatively movable parts one of which is connected to the pointer, said motor being a shaded pole motor having a pair of shading windings, circuits connected to the shading windings respectively and including electron discharge tubes, and means responsive to the tuned condition of the oscillator to control the relative conductivity of the tubes.

10. A measuring circuit comprising a balancing electrical network, means responsive to a condition to be measured connected to the network to unbalance it upon a change in the condition, a device movable to rebalance the network, a reversible electric motor connected to the device to move it, a sensitive instrument connected to the network, a pointer connected to the instrument to be moved thereby in response to changes in balance of the network, an ocsillator including a tuned circuit, a variable reactance device in the tuned circuit to vary the tuning of the oscillator including relatively movable parts one of which is connected to the pointer, said motor being a shaded pole motor having a pair of shading windings, means responsive to the tuned condition of the oscillator to control the relative conductivity of the shading windings, and means responsive to the relative conductivity of the shading windings to impress a rebalancing voltage on the network.

PAUL T. SEMM.
ROBERT T. NAKASONE.

REFERENCES CITED

The following references are of record in the file of this patent:

UNITED STATES PATENTS

| Number | Name | Date |
| --- | --- | --- |
| 1,838,084 | Drake | Dec. 29, 1931 |
| 2,025,749 | Hubbard | Dec. 31, 1935 |
| 2,109,222 | Ryder | Feb. 22, 1938 |
| 2,192,022 | Wills | Feb. 27, 1940 |
| 2,228,163 | Cohen | Jan. 7, 1941 |
| 2,331,138 | Ryder | Oct. 5, 1943 |
| 2,331,698 | Keeler | Oct. 12, 1943 |
| 2,339,861 | Keeler | Jan. 25, 1944 |
| 2,348,177 | Keeler | May 2, 1944 |
| 2,367,869 | Jones | Jan. 23, 1945 |